(12) United States Patent
Yamasaki et al.

(10) Patent No.: US 10,965,179 B2
(45) Date of Patent: Mar. 30, 2021

(54) STATOR UNIT, MOTOR, AND BLOWER APPARATUS

(71) Applicant: Nidec Corporation, Kyoto (JP)

(72) Inventors: Yuta Yamasaki, Kyoto (JP); Hideki Aoi, Kyoto (JP); Yoshihisa Kitamura, Kyoto (JP); Junya Kawata, Kyoto (JP); Rui Izutsu, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 222 days.

(21) Appl. No.: 16/387,627

(22) Filed: Apr. 18, 2019

(65) Prior Publication Data

US 2019/0334405 A1 Oct. 31, 2019

(30) Foreign Application Priority Data

Apr. 27, 2018 (JP) .............................. JP2018-087570

(51) Int. Cl.
| | | |
|---|---|---|
| *H02K 5/10* | (2006.01) | |
| *H02K 1/16* | (2006.01) | |
| *H02K 1/18* | (2006.01) | |
| *F04D 25/06* | (2006.01) | |
| *H02K 5/173* | (2006.01) | |
| *F04D 19/00* | (2006.01) | |
| *H02K 5/08* | (2006.01) | |

(52) U.S. Cl.
CPC .............. *H02K 5/10* (2013.01); *F04D 19/002* (2013.01); *F04D 25/0646* (2013.01); *H02K 1/165* (2013.01); *H02K 1/182* (2013.01); *H02K 5/08* (2013.01); *H02K 5/1735* (2013.01)

(58) Field of Classification Search
CPC .......... H02K 5/10; H02K 1/165; H02K 1/182; H02K 5/1735; H02K 5/08; H02K 5/128; H02K 7/14; H02K 1/187; H02K 11/33; H02K 5/1282; H02K 15/12; H02K 1/14; F04D 25/0646; F04D 19/002
USPC ............................................... 310/67, 86, 89
See application file for complete search history.

(56) References Cited

U.S. PATENT DOCUMENTS

| | | | |
|---|---|---|---|
| 7,635,934 B2 | 12/2009 | Zhu et al. | |
| 7,667,359 B2 | 2/2010 | Lee et al. | |
| 9,869,321 B2* | 1/2018 | Ishihara | ................ F04D 19/002 |
| 10,164,498 B2 | 12/2018 | Otsuka | |
| 2007/0145842 A1* | 6/2007 | Zhu | ........................ F04D 29/646 |
| | | | 310/88 |

FOREIGN PATENT DOCUMENTS

| | | | |
|---|---|---|---|
| JP | 1-290996 A | 11/1989 | |
| JP | 5065997 B2 | 11/2012 | |

* cited by examiner

*Primary Examiner* — Thomas Truong
(74) *Attorney, Agent, or Firm* — Keating & Bennett (57) ABSTRACT

A stator assembly includes a stator that drives a rotor rotatable about a central axis extending in a vertical direction, a cover that accommodates the stator, a filling portion that fills a space between the cover and the stator. The cover includes a tubular portion that extends in an axial direction and covers a radially side portion of the stator opposing the rotor in a radial direction, a lid portion that covers an axially upper end portion of the stator, and a cover stepped portion that is provided on a first radial side with respect to the tubular portion. The cover stepped portion comes in contact with the axially upper end portion of the stator and is positioned on an axially lower side with respect to an axially upper end portion of the tubular portion.

18 Claims, 5 Drawing Sheets

STATOR UNIT, MOTOR, AND BLOWER APPARATUS

CROSS REFERENCE TO RELATED APPLICATION

The present invention claims priority under 35 U.S.C. § 119 to Japanese Application No. 2018-087570 filed on Apr. 27, 2018 the entire contents of which is incorporated herein by reference.

FIELD OF THE INVENTION

The present disclosure relates to a stator unit, a motor, and a blower apparatus.

BACKGROUND

In order to enhance water-proofness of a stator, a technique of covering the stator with a cover member having a covered tubular shape has been known. For example, in Japanese Unexamined Patent Application Publication No. 2007-159393, a stator assembly is disposed in an accommodation space of a first cover in order to provide a water-proof effect. A space between the first cover and the stator assembly is filled with a filler.

Meanwhile, when a rotor is attached to the stator and is driven, rotational characteristics of the rotor are affected by a thickness of a tubular portion of the cover member covering the stator. This is because the tubular portion generates a magnetic gap between the rotor and the stator. The thicker the tubular portion is, the greater such influence is.

On the other hand, the influence decreases if the tubular portion is made thinner, but the tubular portion is likely to be deformed, and the accuracy of an axial position of the cover member with respect to the stator is likely to deteriorate.

SUMMARY

Example embodiments of the present invention are able to accurately determine an axial position of a cover with respect to a stator.

An example stator assembly of the present disclosure includes a stator capable of driving a rotor rotatable about a central axis, a cover that accommodates the stator, a filling portion that fills at least a space between the cover and the stator inside the cover. The stator includes a core back portion having an annular shape with the central axis as a center and a plurality of teeth portions that extends from the core back portion to a second radial side. The cover includes a tubular portion that extends in an axial direction and covers a radially side portion of the stator that opposes the rotor in a radial direction, a lid portion that covers an axially upper end portion of the stator, and a cover stepped portion that is provided on a first radial side of the tubular portion from the tubular portion toward the stator in the radial direction with respect to the tubular portion. An axially lower end portion of the cover stepped portion comes in contact with the axially upper end portion of the stator and is positioned on an axially lower side with respect to an axially upper end portion of the tubular portion.

An example motor of the present disclosure includes a rotor rotatable about a central axis, and the stator assembly that includes a stator capable of driving the rotor.

An example blower apparatus of the present disclosure includes the motor, and a blade portion rotatable about a central axis together with the rotor of the motor.

According to the example stator assembly, motor, and blower apparatus of the present disclosure, it is possible to accurately determine the axial position of the cover member with respect to the stator.

The above and other elements, features, steps, characteristics and advantages of the present disclosure will become more apparent from the following detailed description of the example embodiments with reference to the attached drawings.

DETAILED DESCRIPTION

Hereinafter, example embodiments of the present disclosure will be described with reference to the drawings.

In the specification, a direction parallel to a central axis CA in a blower apparatus 300 is referred to as an "axial direction". A first direction in the axial direction from a cap 70 to be described later toward a shaft holder 11 to be described later along the axial direction is referred to as an "axially upper side". A second direction in the axial direction from the shaft holder 11 toward the cap 70 along the axial direction is referred to as an "axially lower side". In each of components, an end portion on the axially upper side is referred to as the "axially upper end portion", and an axial position of the axially upper end portion is referred to as an "axially upper end". Further, an end portion in the axially lower direction is referred to as an "axially lower end portion", and an axial position of the axially lower end portion is referred to as an "axially lower end". In addition, a surface facing the axially upper side is referred to as an "axially upper end surface" among surfaces of each of the components, and a surface facing the axially lower side is referred to as an "axially lower end surface".

In addition, a direction orthogonal to the central axis CA is referred to as a "radial direction". A direction toward the central axis CA along the radial direction is referred to as a "radially inner side" as a first radial side. A direction away from the central axis CA along the radial direction is referred to as a "radially outer side" as a second radial side. In each of the components, an end portion on the radially inner side is referred to as a "radially inner end portion", and a radial position of the radially inner end portion is referred to as a "radially inner end". Further, an end portion on the radially outer side is referred to as a "radially outer end portion", and a radial position of the radially outer end portion is referred to as a "radially outer end". In addition, a side surface facing the radially inner side is referred to as a "radially inner side surface" among surfaces of each of the components, and a side surface facing the radially outer side is referred to as a "radially outer side surface".

In addition, a direction of rotation about the central axis CA is referred to as a "circumferential direction".

In addition, in the specification, an "annular shape" includes not only a shape continuously connected without any cut along the entire circumference in the circumferential direction with the central axis as the center but also an arc shape having a cut in a part of the entire circumference with the central axis as the center.

Note that designations such as the direction, the end portion, the position, the surface, and the like described above do not indicate a positional relationship, a direction, and the like in the case of being incorporated in an actual device.

<1. Example Embodiments>

Figure 1:
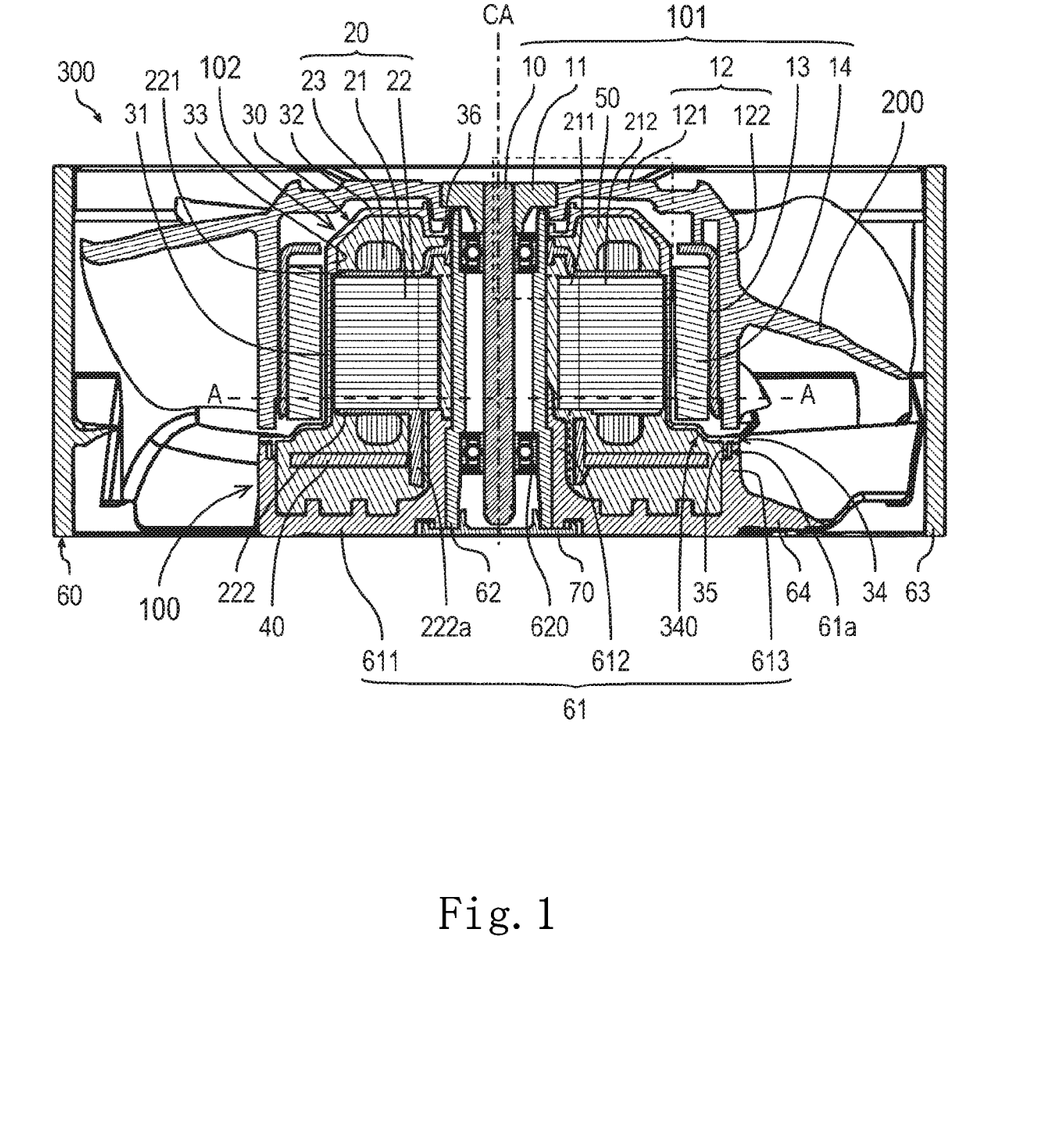
FIG. 1 is a cross-sectional view illustrating a configuration example of a blower apparatus.

FIG. 1 is a cross-sectional view illustrating a configuration example of the blower apparatus 300. FIG. 1 illustrates a cross-sectional structure of the blower apparatus 300 when the blower apparatus 300 is cut with a virtual plane including the central axis CA.

<1-1. Blower Apparatus>

The blower apparatus 300 includes a motor 100 and a blade portion 200. The motor 100 drives the blade portion 200 to rotate. The blade portion 200 is rotatable about the central axis CA extending in the vertical direction together with a rotor 101 to be described later of the motor 100. The blower apparatus 300 generates an air flow flowing the axially upper side to the axially lower side with the rotation of the blade portion 200. Note that the number of the blade portions 200 may be a singular number or plural. Preferably, the number of the blade portions 200 is a prime number. In this manner, it is possible to suppress occurrence of resonance sound.

Incidentally, the blower apparatus 300 is an axial-flow fan that sends air flow in the axial direction in the present example embodiment, but is not limited to this example. For example, the blower apparatus 300 may be a centrifugal fan that sends air flow in the radial direction.

<1-2. Motor>

Figure 2:
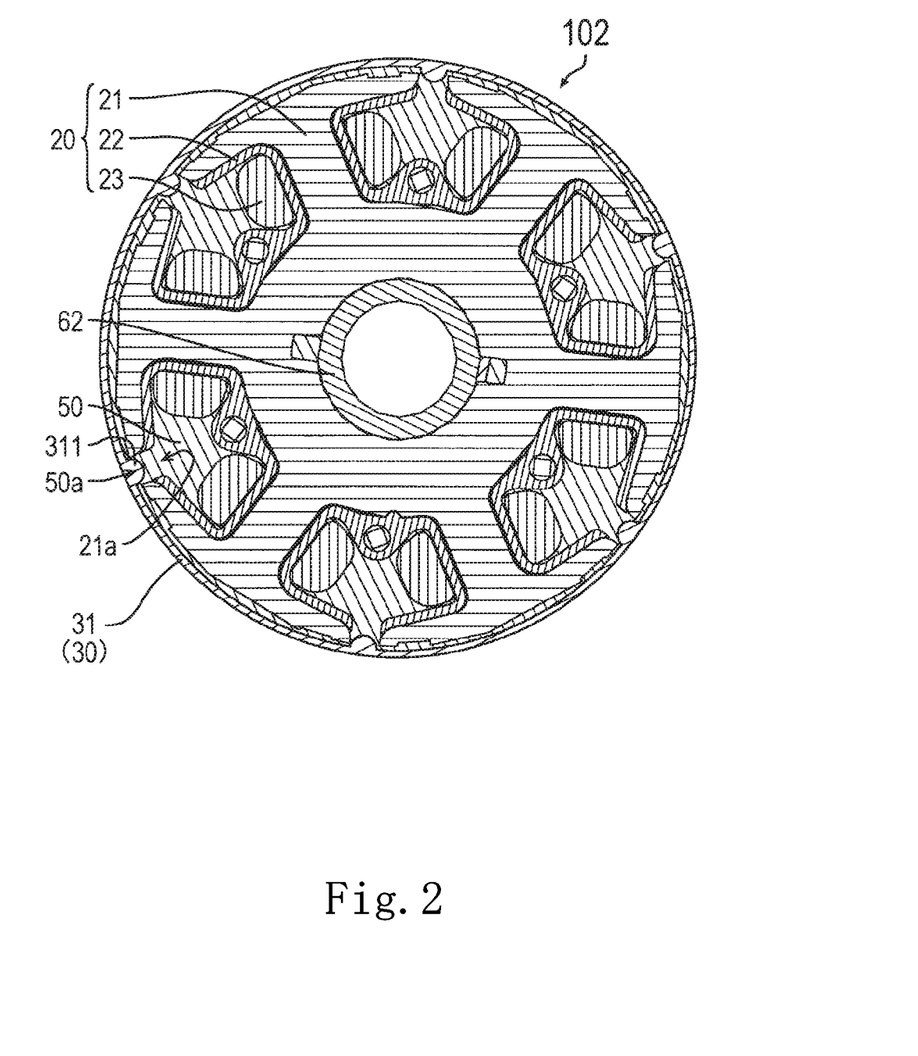
FIG. 2 is a cross-sectional view of a stator assembly of a motor as viewed from an axial direction.
Figure 3:
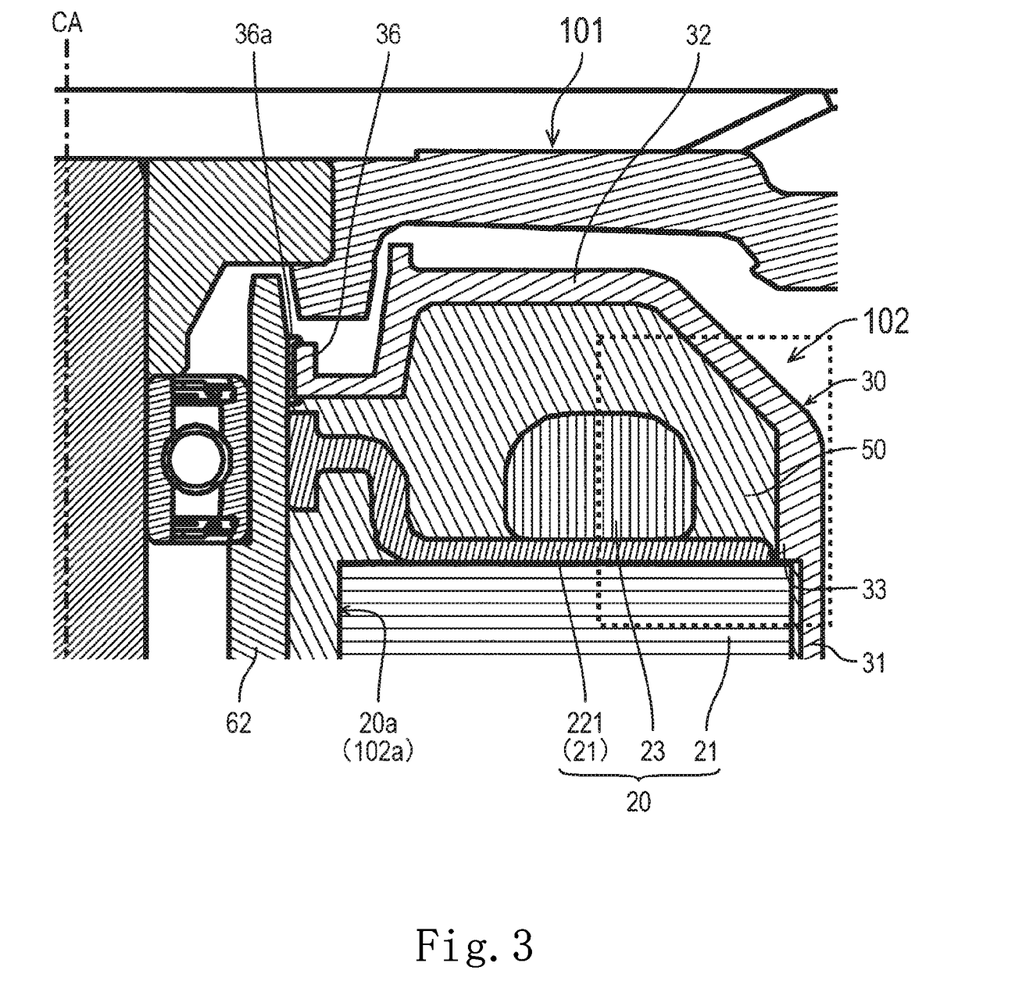
FIG. 3 is a partial cross-sectional view of the blower apparatus.

Next, a configuration of the motor 100 will be described with reference to FIGS. 1 and 2 to 3. FIG. 2 is a cross-sectional view of a stator assembly 102 to be described later of the motor 100 as viewed from the axial direction. FIG. 3 is a partial cross-sectional view of the blower apparatus 300. Note that FIG. 2 corresponds to a cross-sectional structure of the stator assembly 102 in a case where the stator assembly 102 is cut with a virtual plane perpendicular to the central axis CA along line A-A in FIG. 1. FIG. 3 corresponds to a portion surrounded by the broken line in FIG. 1.

The motor 100 includes the rotor 101 and the stator assembly 102. The rotor 101 is rotatable about the central axis CA extending in the vertical direction. The stator assembly 102 has a stator 20 to be described later that can drive the rotor 101.

<1-2-1. Rotor>

The rotor 101 has a shaft 10, a shaft holder 11, a holding member 12, a yoke 13, and a magnet 14.

The shaft 10 is a rotation axis of the rotor 101. The shaft 10 is rotatable about the central axis CA together with the shaft holder 11, the holding member 12, the yoke 13, the magnet 14, and the blade portion 200. The shaft 10 is not limited to this example, and may be a fixed shaft attached to the stator assembly 102. When the shaft 10 is the fixed shaft, a bearing is provided between the shaft 10 and the shaft holder 11.

The shaft holder 11 is attached to the shaft 10 in an axially upper portion of the motor 100. In the present example embodiment, the shaft holder 11 is attached to an axially upper end portion of the shaft 10, and extends to the radially outer side from a radially outer side surface of the shaft 10.

The holding member 12 has a covered tubular shape and includes a rotor lid portion 121 and a rotor tubular portion 122.

The rotor lid portion 121 has a plate shape that is annular about the central axis CA and extends in the radial direction. The rotor lid portion 121 covers a axially upper end portion of the rotor tubular portion 122. A radially outer end portion of the shaft holder 11 is connected to a radially inner end portion of the rotor lid portion 121. The rotor tubular portion 122 has a cylindrical shape that extends to the axially lower side from a radially outer end portion of the rotor lid portion 121. The plurality of blade portions 200 are provided on a radially outer side surface of the rotor tubular portion 122. The yoke 13 is provided on a radially inner side surface of the rotor tubular portion 122.

The yoke 13 has a tubular shape extending in the axial direction and holds the magnet 14. The magnet 14 is provided on a radially inner side surface of the yoke 13.

The magnet 14 is positioned on the radially outer side with respect to the stator 20 of the stator assembly 102 and opposes a radially outer side surface of the stator 20 in the radial direction. The magnet 14 has magnetic poles different from each other. The respective magnetic poles are alternately arranged in the circumferential direction. The magnet 14 may have an annular shape about the central axis CA. Alternatively, the magnet may be a plurality of magnet pieces arranged in the circumferential direction.

<1-2-2. Stator Assembly>

The stator assembly 102 includes the stator 20, a cover member 30, a substrate 40, a filling portion 50, and a housing 60.

The stator 20 has an annular shape about the central axis CA, and is supported by a bearing holder 62 to be described later of the housing 60. As described above, the stator assembly 102 includes the stator 20. The stator 20 is capable of driving the rotor 101 which is rotatable about the central axis CA and extends in the vertical direction. More specifically, the stator 20 drives the rotor 101 to rotate in the circumferential direction when the motor 100 is driven. The stator 20 includes a stator core 21, and insulator 22, and a plurality of coil portions 23.

As described above, the stator 20 has the stator core 21. The stator core 21 is a magnetic body annular about the central axis CA, and is a stacked body in which a plurality of platy electromagnetic steel plates are stacked in the present example embodiment. The stator core 21 is fixed to the bearing holder 62. In the present example embodiment, a radially inner end portion of the stator core 21 is fixed to a radially outer side surface of the bearing holder 62. A radially outer side surface of the stator core 21 opposes the magnet 14 in the radial direction.

The stator core 21 includes a core back portion 211 and a plurality of teeth portions 212.

In other words, the stator 20 has the core back portion 211 and the plurality of teeth portions 212. The core back portion 211 is annular about the central axis CA. Each of the plurality of teeth portions 212 extends to the radially outer side from the core back portion 211.

In addition, the stator core 21 has a slot 21a. The slot 21a is a gap between the teeth portions 212 adjacent in the circumferential direction. The slot 21a is provided on the radially outer side surface of the stator core 21. More specifically, the slot 21a is provided between the plurality of teeth portions 212 extending to the radially outer side. The slot 21a is recessed to the radially inner side and extends in the axial direction.

The insulator 22 covers at least a part of the stator core 21. In particular, the insulator 22 covers at least a part of the teeth portion 212. The insulator 22 is an insulating member made of a resin material or the like.

The insulator 22 includes an upper insulator 221. The upper insulator 221 covers an axially upper end surface of the stator core 21. A radially inner end portion of the upper insulator 221 comes in contact with the radially outer side surface of the bearing holder 62.

In addition, the insulator 22 further includes a lower insulator 222 and a support arm portion 222a. The lower insulator 222 covers an axially lower end surface of the stator core 21. The support arm portion 222a is provided on an axially lower end surface of the lower insulator 222.

The support arm portion 222a extends to the axially lower side from the axially lower end surface of the lower insulator 222 and supports the substrate 40.

Each of the plurality of coil portions 23 is a winding member in which a conductive wire is wound around the stator core 21 via the insulator 22. End portions of the conductive wire are electrically connected to the substrate 40.

The cover member 30 will be described later.

The substrate 40 is arranged on the axially lower side with respect to the stator 20. The substrate 40 is electrically connected to the conductive wire of the coil portion 23 and a connection wire (not illustrated) led out of the housing 60.

As described above, the stator assembly 102 includes the filling portion 50. At least a space between the cover member 30 and the stator 20 inside the cover member 30 is filled with the filling portion 50. The filling portion 50 covers the surface of the stator 20 with a filling material. For example, the filling portion 50 covers at least a part of the stator core 21, the upper insulator 221, the lower insulator 222, the coil portion 23, and the like. The filling material of the filling portion 50 is, for example, a resin material.

Note that the filling portion 50 covers the radially outer side surface of the stator core 21 in the present example embodiment as illustrated in FIG. 2. However, the present disclosure is not limited to this example, and a tubular portion 31 to be described later of the cover member 30 may cover the radially outer side surface of the stator core 21. In this case, the filling portion 50 covers the surface of the stator core 21 other than the radially outer side surface.

Further, the filling portion 50 has a groove portion 50a. The groove portion 50a is provided on a radially outer side surface of the filling portion 50 filling the inside of the slot 21a of the stator core 21. The groove portion 50a is recessed to the radially inner side and extends in the axial direction. In the present example embodiment, a rib 311 to be described later of the cover member 30 fits into the groove portion 50a.

The housing 60 includes a bracket portion 61, the bearing holder 62, a housing tubular portion 63, and a spoke portion 64. In other words, the stator assembly 102 includes the bracket portion 61, the bearing holder 62, the housing tubular portion 63, and the spoke portion 64.

As described above, the bracket portion 61 supports the bearing holder 62. In the present example embodiment, the bracket portion 61 has a covered tubular shape. As described above, the stator assembly 102 includes the bracket portion 61. The bracket portion 61 covers an axially lower end portion of the tubular portion 31 of the cover member 30.

The bracket portion 61 has a lower lid portion 611, a bearing holder holding portion 612, and an outer wall portion 613.

The lower lid portion 611 has a plate shape that is annular about the central axis CA and extends in the radial direction. The bearing holder holding portion 612 is provided at a radially inner end portion of the lower lid portion 611. The outer wall portion 613 is provided at a radially outer end portion of the lower lid portion 611.

The bearing holder holding portion 612 holds the bearing holder 62. The bearing holder holding portion 612 protrudes to the axially upper side from the radially inner end portion of the lower lid portion 611 and extends in the circumferential direction. In the present example embodiment, the bearing holder holding portion 612 has a tubular shape that extends in the axial direction with the central axis CA as a center. The bearing holder 62 is provided at a radially inner end portion of the bearing holder holding portion 612.

The outer wall portion 613 protrudes to the axially upper side from the radially outer end portion of the lower lid portion 611 and extends in the circumferential direction. In the present example embodiment, the outer wall portion 613 is annular about the central axis CA. A bracket concave portion 61a into which a wall portion 35 to be described later of the cover member 30 is fitted is provided at an axially upper end portion of the bracket portion 61.

The bracket portion 61 further includes the bracket concave portion 61a. The bracket concave portion 61a is provided at an axially upper end portion of the outer wall portion 613. The bracket concave portion 61a is recessed to the axially lower side at least from an axially upper end surface of the outer wall portion 613. Note that the bracket concave portion 61a is open toward the axially upper side and the radially inner side in the present example embodiment. That is, it can be said that the bracket concave portion 61a is recessed to the radially outer side from the radially inner side surface of the outer wall portion 613.

The bearing holder 62 has a tubular shape that extends in the axial direction. The bearing holder 62 is inserted into the tubular bearing holder holding portion 612 of the bracket portion 61 and fixed into the bearing holder holding portion 612. In the present example embodiment, the bearing holder 62 is a stator support member that supports the stator 20 in the outer rotor-type motor 100. The stator assembly 102 of the motor 100 includes the bearing holder 62 as described above. A radially inner end portion of the stator 20 is fixed to the bearing holder 62. Bearings 620 are provided in an axially upper portion and an axially lower portion of the motor 100 inside the bearing holder 62. Further, the shaft 10 is inserted into the bearing holder 62 and the bearing 620. The bearing holder 62 rotatably supports the shaft 10 via the bearing 620. Note that the bearing 620 is a ball bearing in the present example embodiment, but is not limited to this example, and may be a sleeve bearing or the like, for example.

The housing tubular portion 63 has a tubular shape that extends in the axial direction. The housing tubular portion 63 is connected to the bracket portion 61 by the spoke portion 64 in an axially lower portion of the blower apparatus 300.

For example, a radially outer end portion of the spoke portion 64 is connected to a radially inner side surface of the housing tubular portion 63. A radially inner end portion of the spoke portion 64 is connected to a radially outer end portion of the bracket portion 61. The housing tubular portion 63 supports the bracket portion 61 via the spoke portion 64.

The housing tubular portion 63 accommodates the motor 100 and the blade portion 200. More specifically, the housing 60 accommodates the rotor 101, the stator assembly 102 other than the housing tubular portion 63, and the blade portion 200. Note that the stator assembly 102 other than the housing tubular portion 63 includes, for example, the stator 20, the cover member 30, the substrate 40, the filling portion 50, the bracket portion 61, the bearing holder 62, and the spoke portion 64.

The cap 70 is fitted into an axially lower end portion of the bearing holder 62 and covers the axially lower end portion.

<1-2-3. Cover Member>

Figure 4:
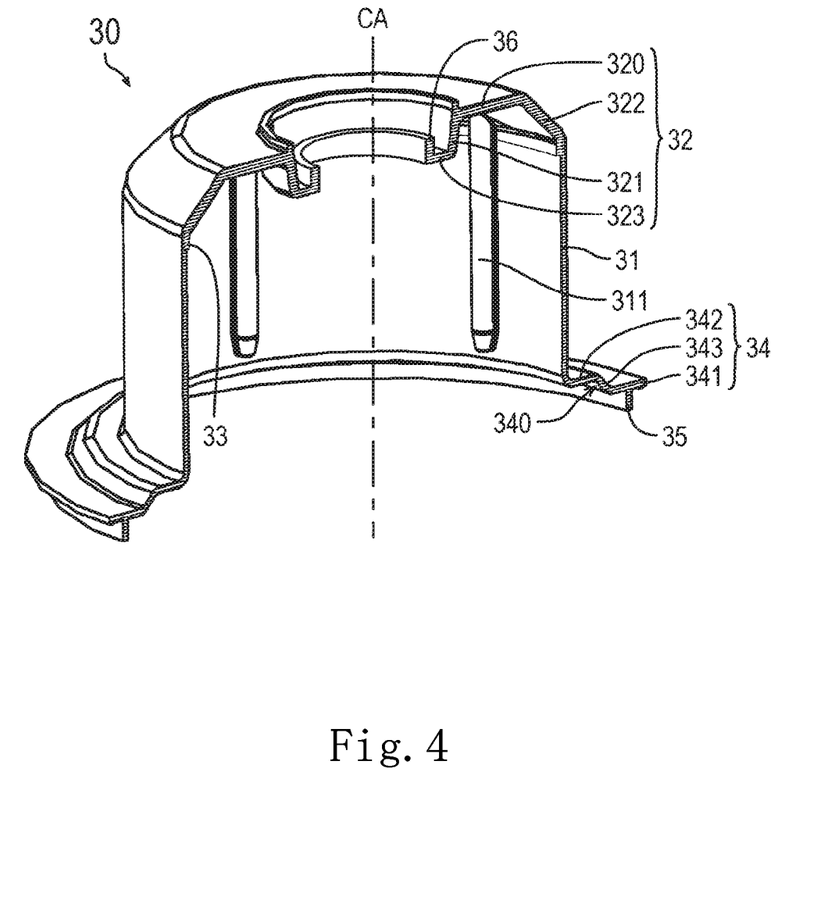
FIG. 4 is a perspective cross-sectional view illustrating a configuration example of a cover member.

Next, a detailed configuration of the cover member 30 will be described with reference to FIGS. 3 and 4. FIG. 4 is a perspective cross-sectional view illustrating a configuration example of the cover member 30. FIG. 4 illustrates a cross-sectional structure of the cover member 30 when the cover member 30 is cut with a virtual plane including the central axis CA.

As described above, the stator assembly 102 includes the cover member 30. The cover member 30 accommodates the stator 20. The cover member 30 has a covered tubular shape. The cover member 30 has a tubular portion 31 having a tubular shape, a lid portion 32, a cover stepped portion 33, a flange portion 34, a wall portion 35, and a collar portion 36.

As described above, the cover member 30 has the tubular portion 31. The tubular portion 31 extends in the axial direction and covers a radially side surface of the stator 20 opposing the rotor 101 in the radial direction. More specifically, the tubular portion 31 covers the radially outer side surface of the stator 20.

In addition, the tubular portion 31 includes the rib 311 extending in the axial direction. In other words, the cover member 30 has the rib 311. The rib 311 is provided on a radially inner side surface of the tubular portion 31 opposing the radially outer side surface of the stator 20. It is possible to improve the strength of the tubular portion 31 by the rib 311. Further, even if the tubular portion 31 is deformed, it is possible to reduce types of such deformation modes. The rib 311 protrudes to the radially inner side and fits into the groove portion 50a. As described above, the groove portion 50a is provided on the radially outer side surface of the filling portion 50 filling the inside of the slot 21a.

A circumferential width of the rib 311 is equal to or smaller than a circumferential width of the slot 21a. In this manner, the rib 311 fits into the groove portion 50a, and thus, fits into the slot 21a between the teeth portions 212 adjacent in the circumferential direction. As a result, it is possible to prevent the tubular portion 31 from rotating with respect to the stator 20. In addition, if both the widths are the same, it is possible to determine a circumferential position of the tubular portion 31 with respect to the stator 20.

This is advantageous, for example, to make it difficult for temporary fixation of the cover member 30 with respect to the stator 20, which is performed at the time of forming the filling portion 50 to be removed. In addition, when the cover member 30 or a member fixed to the cover member 30 has a non-rotationally symmetric shape with respect to the central axis, the above-described rotation fixation and positioning in the circumferential direction are advantageous.

In addition, the circumferential width of the rib 311 becomes narrower as proceeding to the axially lower side at least in an axially lower portion of the rib 311. In this manner, the rib 311 can be easily accommodated in the slots 21a between the teeth portions 212 at the time of attaching the cover member 30 to the stator 20. Therefore, the tubular portion 31 including the rib 311 can be more easily attached to the stator 20.

Next, the cover member 30 has the lid portion 32 as described above. The lid portion 32 covers the axially upper end portion of the tubular portion 31. Further, the lid portion 32 is provided on the axially upper side with respect to the stator 20 and covers an axially upper end portion of the stator 20. The lid portion 32 includes a plate portion 320, a first extending portion 321, and a second extending portion 322. The plate portion 320 has an annular shape about the central axis CA that extends in the radial direction. The plate portion 320 opposes the stator 20 in the axial direction with a gap therebetween. The first extending portion 321 extends to the radially inner side from a radially inner end portion of the plate portion 320 as proceeding to the axially lower side. The second extending portion 322 extends the radially outer side from a radially outer end portion of the plate portion 320 as proceeding to the axially lower side. A radially outer end portion of the second extending portion 322 is connected to the axially upper end portion of the tubular portion 31. In this manner, a dome-shaped space recessed to the axially upper side is provided in a portion surrounded by the plate portion 320 and the first extending portion 321 and the second extending portion 322 extending from both ends in the radial direction of the plate portion 320. At least a portion of the coil portion 23 on the axially upper side with respect to the stator core 21 can be accommodated in the space. Therefore, an axial dimension of the stator assembly 102 can be made more compact.

In addition, the lid portion 32 further includes a third extending portion 323. The third extending portion 323 extends to the radially inner side from an axially lower end portion of the first extending portion 321.

Next, the cover member 30 has the cover stepped portion 33 as described above. The cover stepped portion 33 is provided on the radially inner side with respect to the tubular portion 31 from the tubular portion 31 toward the stator 20 in the radial direction. In the present example embodiment, the cover stepped portion 33 is provided on a radially inner side surface of the axially upper end portion of the tubular portion 31 and an axially lower end surface of the second radially end portion of the lid portion 32.

An axially lower end portion of the cover stepped portion 33 comes in contact with an axially upper end surface of the teeth portion 212. More specifically, at least a part of the axially lower end portion of the cover stepped portion 33 comes in contact with the axially upper end surface of the teeth portion 212. In addition, the axially lower end portion of the cover stepped portion 33 is positioned on the axially lower side with respect to the axially upper end portion of the tubular portion 31. In this manner, it is possible to accurately determine an axial position of the cover member 30 with respect to the stator 20 by bringing the axially lower end portion of the cover stepped portion 33 into contact with the axially upper end portion of the stator 20 at the time of attaching the cover member 30 to the stator 20.

In addition, the cover stepped portion 33 comes in contact with the axially upper end surface of the stator core 21 in the present example embodiment. More specifically, the axially lower end portion of the cover stepped portion 33 comes in contact with the axially upper end surface of the teeth portion 212. In this manner, the axial position of the cover member 30 at the time of attaching the cover member 30 to the stator 20 can be determined by the contact between the axially upper end surface of the teeth portion 212 and the axially lower end portion of the cover stepped portion 33.

Figure 5:
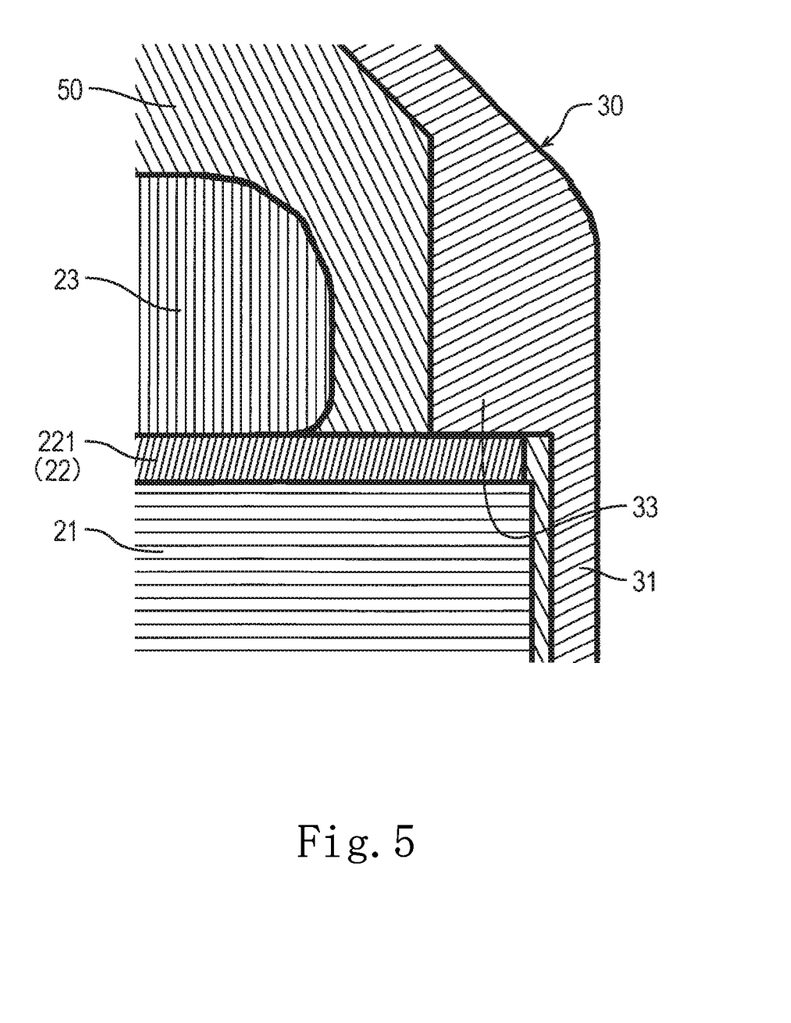
FIG. 5 is a partial cross-sectional view illustrating another configuration example of a cover stepped portion.

Alternatively, the axially lower end portion of the cover stepped portion 33 is not limited to the above example, and may come in contact with an axially upper end surface of the insulator 22, and particularly, may come in contact with an axially upper end surface of the upper insulator 221 as illustrated in FIG. 5. In this manner, the axial position of the cover member 30 at the time of attaching the cover member 30 to the stator 20 can be determined by the contact between the axially upper end surface of the insulator 22 and the axially lower end portion of the cover stepped portion 33.

In addition, the cover stepped portion 33 is annular about the central axis CA in the present example embodiment. Accordingly, it is easy to produce a mold for molding the cover member 30.

Alternatively, the present disclosure is not limited to the above example, and a plurality of the cover stepped portions 33 may be arrayed in the circumferential direction. In this manner, the cover stepped portion 33 can have a configuration other than the annular shape.

Next, the cover member 30 further has the flange portion as described above. The flange portion 34 extends to the radially outer side from the axially lower end portion of the tubular portion 31. In this case, a shape of the cover member 30 is stabilized by the flange portion 34. In addition, when a thickness (that is, a radial thickness) of the tubular portion 31 is made thin, the tubular portion 31 is easily deformed so that it is difficult to attach the tubular portion 31 to the stator 20. Since the flange portion 34 is provided, a shape of the tubular portion 31 can be stabilized and is easily attached to the stator 20.

An axially lower end surface of the flange portion 34 opposes or comes in contact with the bracket portion 61. More specifically, the axially lower end surface of the flange portion 34 comes in contact with the axially upper end portion of the outer wall portion 613 of the bracket portion 61 in the present example embodiment. However, the axially lower end surface of the flange portion 34 is not limited to this example, and may oppose the bracket portion 61 with a gap therebetween, and particularly, may oppose the axially upper end portion of the outer wall portion 613 with a gap therebetween. Accordingly, it becomes easy to attach the tubular portion 31 to the bracket portion 61. In addition, the adhesion between the tubular portion 31 and the bracket portion 61 is improved at the axially lower end portion of the tubular portion 31. Therefore, when the filling portion 50 is provided, the filling material filling the inside of the cover member 30 is less likely to leak to the outside of the cover member 30 and the bracket portion 61. In addition, it is possible to lengthen an entry path of moisture and dust from the outside of the stator assembly 102 to the stator core 21, the substrate 40, and the like inside the stator assembly 102. Accordingly, it is possible to improve the water-proofness and dust-proofness of the stator assembly 102.

In addition, the flange portion 34 includes a step 340. The step 340 has a height difference in the axial direction in a cross-sectional view as viewed from the circumferential direction. More specifically, the step 340 has a first plate portion 341, a second plate portion 342, and a connecting plate portion 343. In other words, the flange portion 34 has these portions. The first plate portion 341 has a plate shape that extends to the radially outer side from the axially lower end portion of the tubular portion 31. The second plate portion 342 has a plate shape that extends to the radially outer side from the other edge portion of the connecting plate portion 343. The connecting plate portion 343 connects the first plate portion 341 and the second plate portion 342. The connecting plate portion 343 has a plate shape that extends from a radially outer end portion of the first plate portion 341 toward a radially inner end portion of the second plate portion 342. In the present example embodiment, the connecting plate portion 343 extends to the radially outer side as proceeding to the axially lower side.

In this case, the strength of the flange portion 34 is improved so that the flange portion 34 is hardly deformed. In addition, it is possible to adjust axial positions of the stator 20, the tubular portion 31, and the like with respect to the bracket portion 61 by adjusting the height difference of the step 340 of the flange portion 34. Since such adjustment is possible, for example, an axial width of the space between the stator 20 and the bracket portion 61 can be adjusted. For example, it is possible to widen the axial width of the space such that an electronic component can be mounted on an axial end surface of the substrate 40 provided in the space.

In addition, the cover member 30 has the wall portion 35 as described above. The wall portion 35 protrudes to the axially lower side from the flange portion 34 and extends in the circumferential direction. The wall portion 35 is fitted into the bracket concave portion 61a to be described later provided at the axially upper end portion of the bracket portion 61. In this manner, the tubular portion 31 can be connected to the bracket portion 61 by easy attachment work. In addition, it is possible to easily align the cover member 30 with respect to the bracket portion 61 in a direction perpendicular to the central axis CA. In addition, when the filling portion 50 is provided, the filling material filling the inside of the cover member 30 is further less likely to leak to the outside of the cover member 30 and the bracket portion 61.

Next, the cover member 30 has the collar portion 36 as described above. The collar portion 36 is provided at a radially inner end portion of the lid portion 32 and extends in the axial direction. In the present example embodiment, the collar portion 36 extends to the axially upper side from a radially inner end portion of the third extending portion 323.

A radially inner side surface of the collar portion 36 comes in contact with the radially outer side surface of the bearing holder 62. Preferably, the entire radially inner side surface of the collar portion 36 comes in contact with the radially outer side surface of the bearing holder 62. However, the present disclosure is not limited to this example, and a part of the radially inner side surface of the collar portion 36 may come in contact with the radially outer side surface of the bearing holder 62. That is, it is sufficient that at least a part of the radially inner side surface of the collar portion 36 comes in contact with the bearing holder 62.

In this manner, the contact area between the cover member 30 and the bearing holder 62 becomes wider. Therefore, the entry of water and dust through the space between the cover member 30 and the bearing holder 62 can be suppressed or prevented. In addition, it is difficult for water and dust to accumulate between the cover member 30 and the bearing holder 62. Accordingly, the environmental resistance of the stator assembly 102 is improved. In addition, the first extending portion 321 is pushed to the radially inner side by the filling material filling the space between the stator 20 and the cover member 30 at the time of forming the filling portion 50. Thus, the collar portion 36 is pressed against the bearing holder 62 by a force directed to the radially inner side. As a result, the adhesion between the collar portion 36 and the bearing holder 62 is enhanced. It is possible to prevent a leakage of the filling material between the collar portion 36 and the bearing holder 62 so that the filling material can be saved.

In the present example embodiment, the collar portion 36 comes in contact with the bearing holder 62 via an adhesive 36a. That is, the stator assembly 102 further includes the adhesive 36a. The adhesive 36a is provided between the radially inner side surface of the collar portion 36 and the radially outer side surface of the bearing holder 62. The collar portion 36 is bonded to the bearing holder 62 using the adhesive 36a. In this manner, the entry of water and dust through the space between the cover member 30 and the bearing holder 62 can be suppressed or prevented more effectively by the adhesive 36a.

In the present example embodiment, the tubular portion 31, the lid portion 32, and the cover stepped portion 33 are portions as a single member. Further, preferably, the flange portion 34, the wall portion 35, and the collar portion 36 are also portions forming the single member with the above portions. In this manner, the cover stepped portion 33 functions as a runner when the cover member 30 is molded by injecting a molding material from an injection port positioned at the radially inner side with respect to the tubular portion 31. Therefore, it is possible to promote flow of the material such as resin. Therefore, the material easily spreads to the tubular portion 31. In addition, when the filling portion 50 is provided, the cover stepped portion 33 in contact with the axially upper end portion of the stator 20 functions as a weir with respect to the flow of the filling material, and thus, it is possible to sufficiently fill the space between the stator 20 and the lid portion 32 with the filling material.

The present disclosure is not limited to the above example, and at least a part of each of the tubular portion 31, the lid portion 32, the cover stepped portion 33, the flange portion 34, the wall portion 35, and the collar portion 36 may be separate members.

In particular, the tubular portion 31 and the lid portion 32 may be separate members. In this manner, each of the tubular portion 31 and the lid portion 32 can be molded more easily and accurately. In addition, a design and a molding process thereof can be changed for each of the tubular portions 31 and each of the lid portions 32, and thus, the versatility of the tubular portion 31 and the lid portion 32 is improved. In addition, short shot or the like is less likely to occur in the tubular portion 31 as compared with the case where the tubular portion 31 is molded integrally with the lid portion 32. Therefore, it is possible to improve the yield at the time of molding the tubular portion 31. In addition, the stator 20 can be fitted into the tubular portion 31 while viewing the state at the time of attaching the cover member 30 to the stator 20. For example, it is possible to fit the stator 20 while viewing the state so as to prevent the thin tubular portion 31 from being deformed. Accordingly, it is possible to improve the productivity of the stator assembly 102.

<2. Other>

The example embodiment of the present disclosure has been described as above. A scope of the present disclosure is not limited to the above-described example embodiment. The present disclosure can be implemented with various modifications within a scope not departing from a gist of the disclosure. In addition, the matters which have been described in the above example embodiment can be combined arbitrarily within a scope having no inconsistency.

For example, the motor 100 is the outer rotor type in the above example embodiment, but is not limited to this example, and may be an inner rotor type. When the motor 100 is the inner rotor type, a "first radial side" and a "second radial side" are opposite to those in the outer rotor type. For example, in the case of the inner rotor type, the cover stepped portion 33 is provided on the radially outer side with respect to the tubular portion 31.

The present disclosure is useful for a motor and a blower apparatus including a stator assembly to which a cover member is attached to a stator.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A stator assembly comprising:
   a stator capable of driving a rotor rotatable about a central axis extending in a vertical direction;
   a cover that accommodates the stator; and
   a filling portion that fills at least a space between the cover and the stator inside the cover; wherein the stator includes:
   a core back portion having an annular shape with the central axis as a center; and
   a plurality of teeth extending from the core back portion to a second radial side;
   the cover includes:
   a tubular portion that extends in an axial direction and covers a radially side portion of the stator that opposes the rotor in a radial direction;
   a lid portion that covers an axially upper end portion of the stator; and
   a cover stepped portion that is provided on a first radial side of the tubular portion from the tubular portion toward the stator in the radial direction with respect to the tubular portion; and
   an axially lower end portion of the cover stepped portion contacts the axially upper end portion of the stator and is positioned on an axially lower side with respect to an axially upper end portion of the tubular portion.

2. The stator assembly according to claim 1, wherein the axially lower end portion of the cover stepped portion contacts with an axially upper end surface of the teeth.

3. The stator assembly according to claim 1, wherein
   the stator further includes an insulator covering at least a portion of the teeth; and
   the axially lower end portion of the cover stepped portion contacts with an axially upper end surface of the insulator.

4. The stator assembly according to claim 1, wherein cover stepped portion is annular about the central axis.

5. The stator assembly according to claim 1, wherein a plurality of the cover stepped portions are arrayed in a circumferential direction.

6. The stator assembly according to claim 1, wherein the tubular portion, the lid portion, and the cover stepped portion are integral portions of a same single member.

7. The stator assembly according to claim 1, wherein the tubular portion and the lid portion are separate members.

8. The stator assembly according to claim 1, wherein
   the lid portion includes:
   a plate portion that has an annular shape and extends in the radial direction with the central axis as a center;
   a first extending portion extending from a first radially end portion of the plate portion to the first radial side as proceeding toward the axially lower side; and
   a second extending portion extending from a second radially end portion of the plate portion toward the second radial side as proceeding toward the axially lower side;

the plate portion opposes the stator in the axial direction with a gap therebetween; and a second radially end portion of the second extending portion is connected to the axially upper end portion of the tubular portion.

9. The stator assembly according to claim 1, further comprising:

a bearing holder to which a first radially end portion of the stator is fixed; wherein the cover includes a collar portion that is provided at a first radially end portion of the lid portion and extends in the axial direction; and a first radially side surface of the collar portion contacts with a second radially side surface of the bearing holder.

10. The stator assembly according to claim 1, wherein the tubular portion includes a rib extending in the axial direction; and the rib is provided on a first radially side surface of the tubular portion that opposes a second radially side surface of the stator.

11. The stator assembly according to claim 10, wherein a slot, recessed to the first radial side, is provided between the plurality of teeth extending to the second radial side; and a circumferential width of the rib is equal to or smaller than a circumferential width of the slot.

12. The stator assembly according to claim 10, wherein a circumferential width of the rib becomes narrower as the rib approaches the axially lower side at least in an axially lower portion of the rib.

13. The stator assembly according to claim 1, wherein the cover further includes a flange portion extending from an axially lower end portion of the tubular portion to the second radial side.

14. The stator assembly according to claim 13, further comprising:

a bracket portion that covers the axially lower end portion of the tubular portion; wherein an axially lower end surface of the flange portion opposes or contacts the bracket portion.

15. The stator assembly according to claim 13, wherein the flange portion includes a step with a height difference in the axial direction in a cross-sectional view as viewed from a circumferential direction.

16. The stator assembly according to claim 13, wherein the cover further includes a wall portion that protrudes to the axially lower side from the flange portion and extends in a circumferential direction; and a bracket concave portion into which the wall portion is fitted is provided in an axially upper end portion of the bracket portion.

17. A motor comprising:

a rotor rotatable about a central axis extending in a vertical direction; and the stator assembly according to claim 1 that includes a stator capable of driving the rotor.

18. A blower apparatus comprising:

the motor according to claim 17; and a blade portion rotatable about the central axis extending in the vertical direction together with the rotor of the motor.

* * * * *